(12) United States Patent
Naot

(10) Patent No.: US 11,487,929 B2
(45) Date of Patent: Nov. 1, 2022

(54) TARGET DESIGN PROCESS FOR OVERLAY TARGETS INTENDED FOR MULTI-SIGNAL MEASUREMENTS

(71) Applicant: KLA Corporation, Milpitas, CA (US)

(72) Inventor: Ira Naot, Migdal Ha'emek (IL)

(73) Assignee: KLA Corporation, Milpitas, CA (US)

( * ) Notice: Subject to any disclaimer, the term of this patent is extended or adjusted under 35 U.S.C. 154(b) by 308 days.

(21) Appl. No.: 16/890,689

(22) Filed: Jun. 2, 2020

(65) Prior Publication Data

US 2021/0334448 A1 Oct. 28, 2021

Related U.S. Application Data

(60) Provisional application No. 63/016,981, filed on Apr. 28, 2020.

(51) Int. Cl.
*G06F 30/398* (2020.01)
*G03F 7/20* (2006.01)

(52) U.S. Cl.
CPC ............ *G06F 30/398* (2020.01); *G03F 7/705* (2013.01); *G03F 7/70633* (2013.01)

(58) Field of Classification Search
CPC .. G03F 7/705; G03F 7/70633; G03F 7/70683; G06F 2119/18; G06F 30/398
See application file for complete search history.

(56) References Cited

U.S. PATENT DOCUMENTS

| | | |
|---|---|---|
| 7,181,057 B2 | 2/2007 | Adel et al. |
| 7,602,491 B2 | 10/2009 | Kandel et al. |
| 7,924,408 B2 | 4/2011 | DiBiase et al. |
| 8,111,376 B2 | 2/2012 | Adel et al. |
| 8,214,771 B2 | 7/2012 | Adel et al. |
| 8,245,161 B1 | 8/2012 | Tortonese et al. |
| 9,093,458 B2 | 7/2015 | Amir et al. |
| 9,151,712 B1 | 10/2015 | Adel et al. |
| 9,329,033 B2 | 5/2016 | Amit et al. |
| 2010/0175033 A1 | 7/2010 | Adel et al. |
| 2016/0252820 A1 | 9/2016 | Chen et al. |
| 2018/0032662 A1 | 2/2018 | Adel et al. |
| 2018/0217508 A1* | 8/2018 | Urbanczyk ......... G03F 7/70625 |

(Continued)

OTHER PUBLICATIONS

International Search Report dated Jul. 28, 2021 for International Patent Application No. PCT/US2021/027351.

(Continued)

*Primary Examiner* — Peter B Kim
(74) *Attorney, Agent, or Firm* — JDI Patent; Joshua D. Isenberg; Robert Pullman

(57) ABSTRACT

A method, system and computer program product for determination of a metrology target design, comprising generating a first candidate target design for a selected design type compatible with one or more metrology tools or and a set of boundaries for a simulation range Measurement of the first target design with the one or more metrology tools within the boundaries of the simulation range is simulated for two or more measurement settings to generate one or more performance metrics. Simulating the measurement takes into account layer properties of one or more layers in a stack profile. The optimal design is determined from at least the performance metrics based on one or more selection criteria and then sent or stored.

21 Claims, 3 Drawing Sheets

(56) References Cited

U.S. PATENT DOCUMENTS

2018/0329305 A1 11/2018 Boef et al.
2019/0323972 A1 10/2019 Rehman et al.

OTHER PUBLICATIONS

Written Opinion of the International Searching Authority dated Jul. 28, 2021 for International Patent Application No. PCT/US2021/027351.

* cited by examiner

TARGET DESIGN PROCESS FOR OVERLAY TARGETS INTENDED FOR MULTI-SIGNAL MEASUREMENTS

CLAIM OF PRIORITY

This application claims the priority benefit of U.S. Provisional Patent Application No. 63/016,981 filed Apr. 28, 2020, the entire contents of which are incorporated herein by reference for all purposes.

FIELD OF THE INVENTION

Aspects of the present disclosure relate to metrology in circuit layout specifically the present disclosure relates to design of targets for metrology.

BACKGROUND OF THE INVENTION

Fabrication of semiconductor devices requires a number of process steps to accurately form features and layers on a substrate. An accurate alignment of each process step is required to ensure that each layer or feature is in the correct position relative to other features for the device to function. Metrology is used to locate and align the process steps. Some types of metrology use characteristics such as size, shape or thickness of features on the wafer to locate and align processes. Other types of metrology use test patterns created in the layers to locate and align each subsequent layer. The relative position of features within each layer and between layers is referred to as overlay. In general, overlay metrology is used to determine the difference between the location of features in a layer and the intended location of features relative to a previous layer. Properly formed layers have features that are aligned with features of the previous layers while improperly formed layers are may be offset or mis-formed relative to the previous layer.

Overlay metrology measurements can be made in different measurement modes. As used herein the term "measurement mode" refers to method for collecting and analyzing a certain type of measurement signal or set of measurement signals. As used herein, the term "measurement signal" refers to a piece of information collected by a single collection operation by the metrology tool. A non-limiting example of a measurement signal is a microscopy image acquired at a certain optical setting using a defined illumination spectrum. Naturally, the type of signal depends on the type of metrology tool used to collect and analyze the signal. As used herein, the term "metrology tool type" refers to a general class or type of metrology tool that operates in one or more given measurement modes.

There are several different measurement modes for overlay metrology, such as, scatterometry, optical field image, or Electron-beam Image. Overlay metrology measurements generally suffer from two types of problems. The first problem is random errors which maybe errors due to instrument precision or random measurement events such as a transient vibration. Random errors can be removed by taking many measurements and averaging their results. The second problem is systemic errors. Systemic errors are the result of process conditions such as biases in the metrology tool, substrate properties, biases in the properties of the target itself, or any combination thereof. Systemic errors cannot be removed by averaging because the errors are present in each measurement. To reduce these errors accurate target design methods have been devised for single metrology measurements. Current metrology methods only rely on a single type of metrology measurement for overlay and if conditions are unfavorable for the chosen metrology system a new target must be designed and a different metrology system must be used. Currently, multiple different targets must be used to accommodate each metrology types. There is currently no way for a single target to be designed for multiple metrology measurement types.

Thus, there is a need in the art, for a way to produce a single overlay target that is compatible with multiple different measurement modes.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Figure 1:
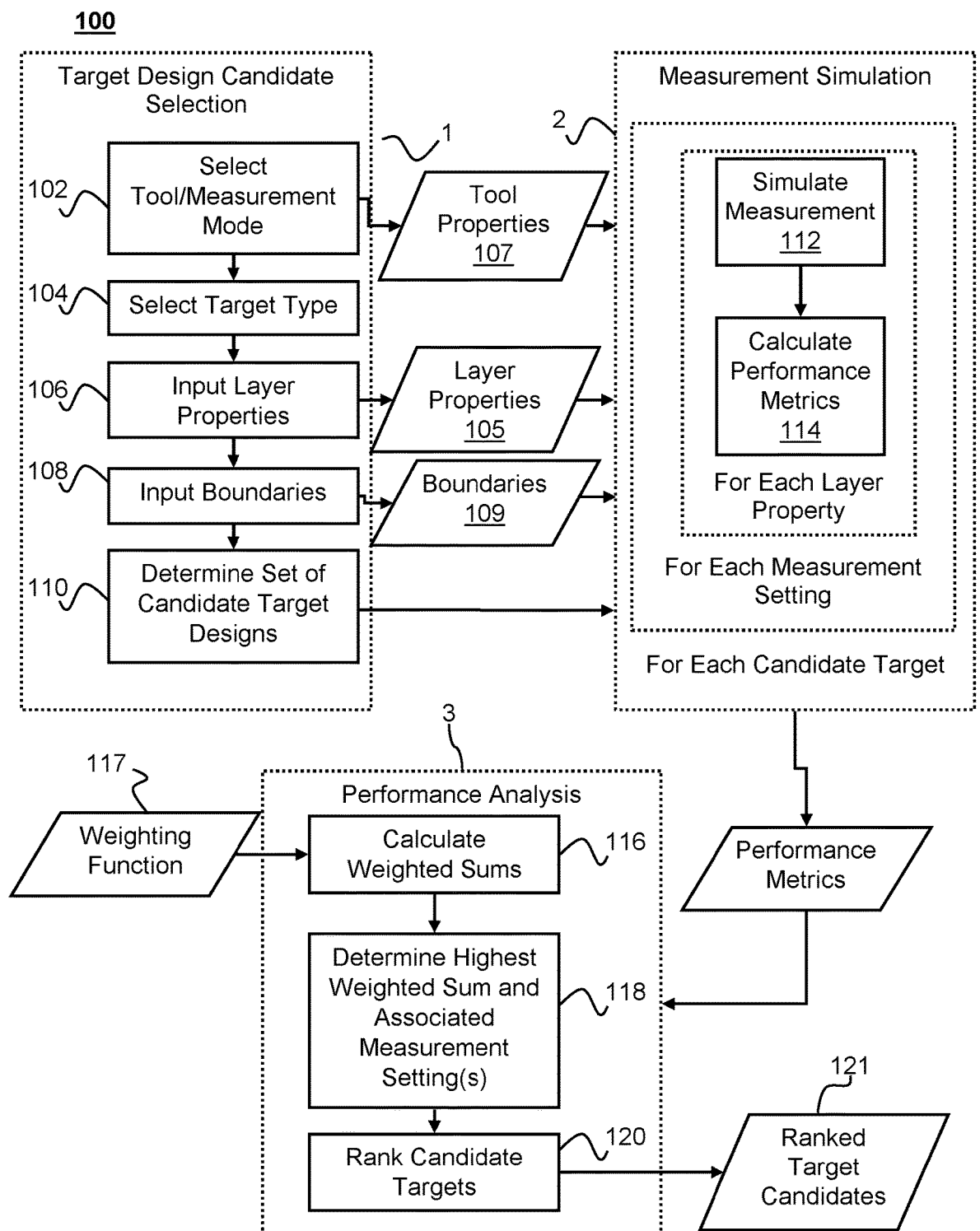
FIG. 1 is a block diagram showing a method for overlay target design using two or more different measurement modes or tool types according to aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of the present disclosure.

Introduction

Semiconductor integrated circuit (IC) manufacturing involves highly complex techniques for integrating circuits into semiconductor materials. One technique includes photolithography, which involves using a combination of etching and deposition processes to transfer patterns corresponding to structures in an IC device from a photomask or reticle to a layer of photoresist. The photoresist is patterned by selectively exposing portions of a resist layer by projecting electromagnetic radiation (e.g., visible, ultraviolet, or X-ray) through a patterned mask onto the resist and developing the resist to remove portions that have been exposed (for a positive resist) or not exposed (for a negative resist). The resulting patterned photoresist layer is then used in selectively etch of material underlying the resist or deposition of material through openings in the pattern in the resist. A typical photomask, or light-blocking mask, is made of a quartz (glass) substrate that supports a patterned layer of opaque material, such as chrome. For instance, one type of light blocking mask is a phase shift mask, or PSM. Other types of masks include advanced phase shift masks, such as embedded attenuating phase shift masks (EAPSM) and alternating phase shift masks (APSM).

As an alternative to electromagnetic energy (including x-rays), charged particle beams, such as electron beams, have been used for high resolution lithographic resist exposure. In particular, electron beams have been used since the low mass of electrons allows relatively accurate control of an electron beam at relatively low power and relatively high speed without the expense of fabricating a physical mask. To expose the resist, a charged particle beam is scanned across a portion of the resist and selectively turned on and off to "write" a pattern onto the resist, which may then be developed as for a photolithographic process. An advantage of electron beam lithography is that the pattern may be stored in electronic form. This can greatly reduce cost, particularly where many patterns are required for a device made of multiple layers.

In general, the pattern for each layer may include both device features and metrology target features. Device features include those features that make up circuit elements of the final device. Metrology target features are often incorporated into portions of a pattern that are not used for device features, such as scribe lines. Metrology typically involves directing some form of probing radiation, either electromagnetic radiation (e.g., infrared, visible, ultraviolet) or charged particles, (e.g., electrons or ions) towards a metrology target and detecting radiation scatted by the target.

An important type of measurement that uses such targets is known as overlay, which generally involves determination of how accurately one patterned layer aligns with respect to a another pattered layer disposed above or below it and also to alignment of different patterns disposed on the same layer. Various technologies for overlay measurements have been developed and employed with varying degrees of success. In general, overlay measurements are performed with target formed into one or more layers of a stack of layers formed on a semiconductor substrate. The type of target used depends on the measurement mode used for the overlay metrology. The present disclosure uses the term "target type" to refer to a type of structure that is patterned on a wafer and is suitable for determining overlay using one or more measurement modes.

In some overlay measurement modes, images of the target may be captured by an imaging tool and an analysis algorithm calculates relative displacement of portions of the target formed in different layers from the captured images. During overlay measurements signals are collected from a single overlay target. However, different parts of the target may be formed in different layers. For example, a commonly used overlay target type is a "Box-in-Box" target, which includes a pair of concentric squares (or boxes) that are built into scribe lines between adjacent dies on successive layers of the wafer. The overlay error is generally determined by comparing the position of one square relative to another square. Another example of an overlay target pattern is the "bar in bar" target, which includes a plurality of parallel bars on successive layers of the wafer. Yet another example of an overlay target type is a grating target. This target type usually includes a first periodic test structure and a second periodic test structure. The first periodic test structure is placed on a first layer of a device and the second periodic structure is placed on a second layer of the device adjacent the first periodic test structure when the second layer is placed on the first layer. Any offset that may occur between the first and second periodic test structures may be detected optically, micro-mechanically or with electron beams. Such grating target types (sometimes referred to as "AIM" marks) can be denser and more robust, than "box" type marks resulting in the collection of more process information, as well as target structures that can withstand the rigors of CMP. The use of such marks is described, e.g., by Adel et al in commonly assigned U.S. Pat. Nos. 6,023,338, 6,921,916 and 6,985,618, all three of which are incorporated herein by reference for all purposes.

In some situations, the same target may be used with different metrology tools, e.g., an imaging tool and a scattering tool or an optical tool and an electron beam tool. Aspects of the present disclosure relate to optimal target design when the same target is to be used with two or more different metrology tools.

Optimal Target Design

According to some aspects of the present disclosure, a target design system may determine a set of candidate target designs for a given layer in a stack profile and a selected target type, tool type, and measurement mode. The candidate target designs are then used in metrology simulations that take into account the design type, layer properties, stack profile and variation ranges for layer properties, target design-parameters range of allowed measurement settings. As used herein, the term "measurement setting" refers to tool parameters that may be adjusted in the tool during the signal-collection process in a given measurement mode. Examples of measurement settings include optical illumination wavelength range, focus setting, polarization, electron-beam energy, choice of e-beam image collection sensor etc. Each set of measurement settings for a given tool in a given measurement mode defines one measurement signal.

For each candidate target design, the metrology simulation simulates a collected signal for each allowed measurement setting and for each possible variation in layer properties and calculates performance metrics for each simulated signal. The simulation produces a different set of performance metrics for each candidate target design, e.g., one for each of the tool settings that were simulated. The system uses a weighing function for summing target performance metrics to create a target ranking and to determine a number of candidate target designs to output. For each target design the system identifies the measurement setting (or set of settings) that gives the highest weighted sum of performance metrics and the associated weighted sum. The system may then rank the candidate target designs according to weighted sum of performance metrics. The system may then output the highest ranking target-designs (exact parameter values), each with their associated tool settings that produce the highest metrics score.

By way of example, and not by way of limitation, the foregoing design process may be applied to design of overlay metrology targets. Parameters of overlay target designs may include target size, width and spacing of lines in the target, wavelength in which the target performs best, etc. In some implementations, simulation for a given candidate overlay target design may be for different layers of the profile stack or for a subset of layers where overlay is critical to production yield. Simulation may be skipped for layers where overlay is not important to production yield or a larger error in overlay may be tolerated. Additionally, the simulations may be limited to significant layers that have an effect on the measurements. Simulation may be skipped for insignificant layers, i.e., layers that do not significantly affect the measurements. By way of example and not by way of limitation, significant layers may include layers containing transistor active-area patterning, transistor gate patterning, via patterning or interconnect patterning. Epitaxial layers and a substrate are usually not significant layers (or not layers at all).

In some important implementations, the generalized target design process described above may be used to design overlay targets for measurements made with a single tool in a single measurement mode using either a single set of tool settings or multiple sets of tool settings. In alternative implementations, the target design process may be readily adapted for design of targets used for measurement in multiple measurement modes and/or with multiple tools.

FIG. 1 shows an example of a method 100 for overlay target design according to aspects of the present disclosure. The method 100 includes three main stages: target design candidate selection 1, measurement simulation 2, and performance analysis 3.

At an input initial step 102 a tool type and measurement mode are input to the simulation system. The selection of tool and measurement mode may limit the possible target design type. The measurement mode may also affect the simulation since some measurement modes may require a single measurement signal and other might require multiple measurement signals. A common case involves a single metrology tool that takes measurements at two or more settings for a given measurement mode. Other possible use cases may involve one or more metrology tools taking measurements in different measurement modes. Where more than one target type is compatible with the selected tool and measurement mode, a target type may be selected and input to the system at 104. Alternatively, the target design system may determine the target type automatically, if only one target type is compatible with the selected tool and measurement mode. Alternatively, the overlay target design type may be a user-specified design type or a design type specified by the metrology tool manufacturer. The determined target design type may have features known to be detectable by the metrology tool or tools or may have features whose detectability is not yet known. The target design type may include the two-dimensional layout of the design such as but not limited to relative line location, relative shape, relative line length and relative number of lines that make up the design. The relative location, relative shape and relative length are relative to the other lines in the design. The overlay target design type may be determined from, for example and without limitation, a database of design types compatible with the metrology tools or tools. The overlay target type may be selected from a set of designs known to be compatible with the metrology tool or tools intended for use.

The properties of the layer for which measurement is to be simulated are input at 106. Examples of such layer properties include, e.g., the layer stack, material properties, nominal thickness, etc. for each layer in the stack for the measurement being simulated. Boundaries for the simulation range may be input to the system, as indicated at 108. Such boundaries may include, e.g., ranges of variation of one or more layer properties, ranges of target design-parameters (size, line-CD, line-pitch, and the like), and ranges of allowed measurement settings to search during simulation. By way of example, and not by way of limitation, the boundaries for a given layer property, target design parameter, or measurement-setting may include an upper bound, a lower bound and an increment size. In some implementations, a lithography recipe may also be specified at this point in some implementations if useful for determining various parameters and boundaries.

The boundaries may include boundaries on ranges of or more target design parameters, such as dimensional specifications, e.g., absolute line width, absolute line length, absolute line thickness, absolute spacing between lines and the properties of the material that will make up the design. Boundaries may also include tolerances for each specified dimension or material property. The measurement setting boundaries are generally chosen to be compatible with the selected tool. For example, and without limitation, measurement settings in optical overlay may include illumination wavelength and polarization, optical system focus-offset, illumination and collection aperture settings and image acquisition method. In certain implementations, the target design parameters and their boundaries may also be selected in accordance with selected tool. In implementations where a target is intended for use with two or more different measurement modes or metrology tools, the metrology tool or tools may have different measurement parameter ranges, e.g., different ranges for linewidth resolution. In such cases, target design parameters may be chosen that are consistent with the overlapping portion of the measurement parameter ranges may be chosen. During simulation design parameters outside of the design parameters for one of the metrology tool or measurement mode may be chosen if the resulting design would have better measurement qualities with one or more of the other contemplated metrology tools or measurement modes.

The system may determine a set of candidate target designs from the selection of metrology tool (or tools), measurement mode, layer properties, and boundaries, as indicated at 110.

Once the candidate target designs have been determined, measurements of the target designs can be simulated within the boundaries of the simulation range. For example, as indicated at 112, for each candidate target the target design system simulates the collected signal for each of the allowed measurement settings and for each of one or more possible variations in stack properties within the boundaries of the simulation range. The target-design system calculates performance metrics for each of the simulated signals, as indicated at 114.

Performance metrics generally relate the quality of measurement, e.g., in terms of accuracy, precision, or robustness. As is generally understood by those skilled in the art, accuracy of measurement generally refers to how closely a measurement compares to an expected value, e.g., when measuring some standard of known value. As generally understood, precision of measurement generally refers to repeatability, i.e., how close repeated measurements are to each other when the same feature is measured repeatedly with the same tool at the same measurement settings. As generally understood, robustness refers to sensitivity of measurements made with a given tool to deviations in measurement settings.

The simulations 112 use layer properties 105, tool properties 107, and boundaries 109. The layer properties 105 may include without limitation a stack profile that specifies the order of layers formed on a substrate at the time of measurement, the physical properties of the materials that make up the substrate and the physical properties of the material or materials that make up each of the layers in the stack profile. The layer properties 105 may include but is not limited to, film or layer thickness, wavelength dependent refractive index, dielectric constant, and substrate thickness.

The tool properties 107 may include properties relevant to the metrology tool or tools used in the measurement being simulated. The tool properties 107 may include metrology tool settings and information that characterizes one or more of the metrology tools. By way of example and not by way of limitation, the measurement settings may include focal lengths, numerical apertures, transmissivities, reflectivities, aberration coefficients, wave length of radiation of a probe, intensity of the radiation of the probe, optical polarization (illumination or collection), illumination spatial structuring (shape and size of the illumination aperture), illumination polarization, optical system focus-offset, illumination and collection aperture settings and image acquisition method light sensitivity of elements in a detector or any other parameter necessary for accurate simulation of metrology tool or tools.

As a general proposition, the term "tool properties" includes measurement settings, i.e., tool properties whose values can be adjusted by a tool operator during normal operation, e.g., by setting switch, turning a knob or entering a value in response to a prompt from a tool operation interface or program. The term "tool properties" also encompasses properties of a tool other than tool settings, e.g., properties generally determined by the tool manufacturer that are more or less fixed in value. As a non-limiting example of a tool setting, consider a metrology tool with multiple operator-selectable settings, such as the wavelength of illuminating radiation. In such a case, the illumination wavelength would be an example of a tool setting. Alternatively, a tool may have selectable operation modes such as a scatterometry tool with both bright and dark field modes. In such a case, the bright or dark field operation setting would be an example of a tool setting. If the tool uses an objective lens of fixed optical properties, e.g., focal length, numerical aperture, etc., these would be examples of tool properties of fixed value as opposed to tool settings.

The stack profile may include without limitation, the number of layers in a stack formed on the substrate, the thickness of each layer, the material composition of each layer (e.g., whether the layer is oxide, nitride, metal, semiconductor, amorphous, crystalline, etc.), the order of the layers in the stack, information relating to a layout of device features in the layers on the substrate, location of targets on previous (i.e., lower) layers in the stack.

The boundaries 109 may include process variation ranges, e.g., variations in physical characteristics of materials during fabrication. During any fabrication process, production of materials varies by a number of uncontrollable factors to account for this variability the process variation ranges are included in the simulations 112. Process variation ranges include variations in specified dimensions and material properties, such as, line width, length, height, spacing when fabricated, layer thickness variation ranges, variation in the refractive index of the substrate or layer, variation in the dielectric constant of the substrate or layers. Additional important parameters include parameters related to the profile of patterned structures, including, e.g., side wall angle, top surface slope, structure asymmetry.

The simulations at 112 mathematically determine the interactions between a metrology tool, the target design, the substrate, and any layers formed on the substrate at the time of measurement. The simulation may model probing radiation used by the metrology tool, scattering of the probing radiation through interaction with the target design, the substrate, one or more layers formed on the substrate, and features on or in the layers of the stack profile and interaction of the scattered radiation with any collection optics and/or detector components of the metrology tool. The simulation may use known mathematical element determination methods such as Maxwell's equations to mathematically approximate measurement using the chosen target design with each of the metrology tool or tools. The simulation may be run for each layer on the substrate in the stack profile starting with the bare substrate. Simulations may be run iteratively building simulation results for each layer formed on the substrate. In some embodiments layers that have overlays that non-critical to production yield may be not simulated or simulated with larger error tolerances. The simulations of one or more layers on the substrate in a stack profile may also include simulations of the effects of masks used in lithographic processes that form parts of the target design as well as other features that may be formed in layers during device fabrication.

The inputs to the simulation may be used as variables in the equations to generate a final approximation of the interactions of the design on the substrate with the metrology tool or tools during measurement. The final approximation may be used to determine a design result which includes information pertinent to the analysis of the overlay target design as well as the design type, design parameters, and optimal tool settings for the design. The information pertinent to the analysis of the overlay target design may include, without limitation, signal to noise ratio, robustness to changes in measurement settings, sensitivity to variations in material properties and specified dimensions. Simulations may be run for each layer on the substrate using the target design type and target parameters. Additionally, tool properties may be changed iteratively during simulation to determine the robustness of the design to changes in tool properties. Optimal tool settings may be determined during iterative adjustment of tool properties. Performance metrics are computed for each design type, design parameters and tool setting combination. The combination with the highest combine result is selected and the optimal tool settings are determined from that combination. Process variation ranges and/or material properties may be iteratively changed during simulation to determine the sensitivity of the overlay target design to variations in the material.

A different set of performance metrics is produced for each of measurement settings that were simulated. These performance metrics are analyzed to determine the best target design or designs. By way of example, and not by way of limitation, performance metrics for overlay measurement with an optical microscopy tool may include 1) overlay measurement precision at best focus, 2) robustness of overlay measurement to focus deviations, illumination wavelength or other measurement settings, and 3) effects on measured overlay of process-induced asymmetries in the target patterned on the wafer. With regard to 2), the calculated precision varies with measurement setting variation, the lower the effect on precision the better. With regard to 3), for a given processed induced asymmetry a lower shift in measured overlay is better. Persons skilled in the art will be able to determine such performance metrics from results of the simulations 112. Skilled persons will also be able to determine other performance metrics for simulations of the same or different measurements in the same or different measurement modes based on these teachings.

By way of example, the system may determine target performance by calculating a weighted sum at 116 in accordance with an input weighing function 117 that defines weights for each performance metric and specifies how to sum the resulting weighted performance metrics to create a target ranking. The system may also use the weighting function to determine the number of ranked target candidates to output. By way of example, for each target design the system determines the measurement setting (or set of settings) that gives the highest weighted sum of metrics and the associated weighted sum, as indicated at 118. The system may then rank the candidate targets, e.g., by the "highest weighted sum of metrics", as indicated at 120. The system may then output the highest ranking candidate target designs 121 (including the relevant target parameter values) and associated measurement settings that produced the highest weighted sum of metrics.

By way of example, and not by way of limitation, consider simulations 112 overlay measurements with an optical microscopy tool. The weighted sum may include a term corresponding to overlay measurement precision at best focus, terms corresponding to robustness of overlay measurement to focus deviation, illumination wavelength deviation or deviation of other measurement settings, respectively, and one or more terms corresponding to effects on measured overlay of process-induced asymmetries in the target patterned on the wafer. Each term may include a product of a performance metric and a corresponding weight. Weights for each term may be assigned according to a relative importance of the corresponding performance metric with higher weights assigned to more important performance metrics. The weighted sum may be, e.g., a simple arithmetic sum of the terms, a sum of squares of the terms, a square root of the sum of squares of the terms, or a root mean square of a product of the terms, e.g., the $n^{th}$ root of the product of n terms or some combination of two or more of these.

The ranked target design results may be saved to a memory and/or a database 110. The target design candidate selection, measurement simulation, and performance analysis may optionally be repeated for different tools or measurement modes, as indicated at 113 with altered design type and/or altered design parameters to generate additional ranked candidate target designs. The additional ranked candidate target designs may then be saved to a memory or database 110.

In some implementations, the ranked target candidates 121 may be compared to one or more selection criteria to determine an optimal overlay target design. The target design that best matches or exceeds the selection criteria may be chosen as the optimal design. The design selection criteria may be provided to the system by the user or may be a design selection criteria determined by the metrology tool or tools. The design selection criteria may include without limitation: signal to noise ratio, robustness to changes in measurement settings, sensitivity to variations in the material or other design metrics that indicate the overall quality of the design as a target for metrology using two or more metrology tool types.

In alternative implementations each candidate target design result may be compared to the selection criteria before simulations are performed for other candidate target designs. If the performance characteristics for the candidate target design meets or exceeds the selection criteria, the system may forego simulations for further designs. If the candidate target design does not meet the selection criteria it may be saved and other simulations may be performed on other designs and the performance characteristics may be aggregated and ranked as discussed above. In yet other alternative implementations, if none of the candidate target designs meet or exceed the selection criteria the candidate target design having performance characteristics closest to the selection criteria may be chosen from the aggregated designs.

The ranked target candidates 121 may include design type, design parameters, optimal tool settings, and signal to noise ratio, robustness to changes in measurement settings, robustness to variation in wafer processing conditions, sensitivity to variations in the material. Such information may be sent, e.g., in electronic form, to a mask fabrication system or electron beam lithography tool or saved for later use. In addition, the ranked target candidate information 121 may include optimal measurement settings for the selected metrology tool or tools. The optimal measurement settings may be sent to the respective metrology tools as part of a metrology recipe. As previously noted, there may be one metrology tool with multiple measurement settings for a single measurement mode or multiple metrology tools and or measurement modes with different measurement settings for each such tool and/or measurement mode.

Process Flow Overview

Figure 2:
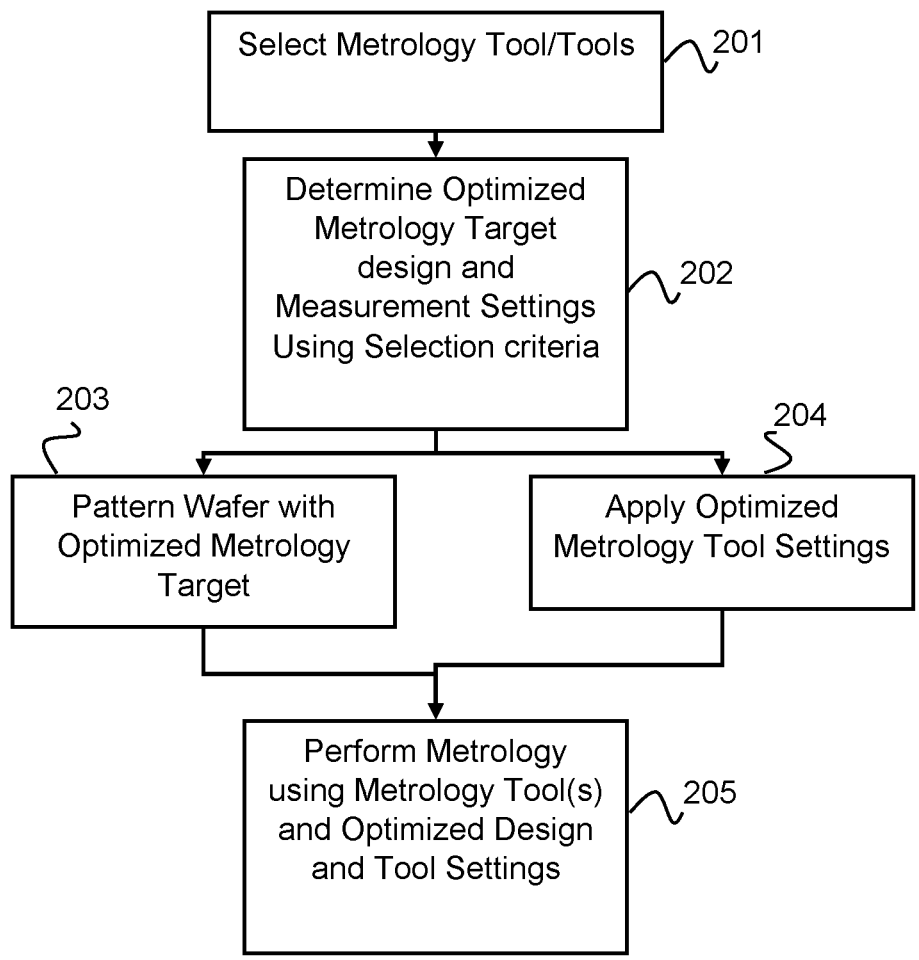
FIG. 2 is a block diagram depicting the optimal overlay target design process in the context of semiconductor device manufacture according to aspects of the present disclosure.

FIG. 2 depicts the optimal overlay target design process in the context of semiconductor device manufacture according to aspects of the present disclosure. As shown initially the metrology tool or tools are selected for use in the semiconductor device manufacture process 201. The metrology tool or tools may be without limitation, any of optical field image, scatterometry, Electron-beam tools, multi-setting optical field image, multi-setting scatterometry, or multi-setting Electron beam alone or in combination. A multi-setting metrology tool takes multiple metrology measurements using different tool settings for each measurement. The multi-setting metrology tool may be a metrology tool having the ability to take measurements at multiple settings without the user changing the metrology settings or a metrology tool that takes a measurement at a single setting and the user changes the settings and takes another measurement with the new setting or a single metrology tool with multiple modes of operation. For example, and without limitation, a multi-setting metrology may be a scatterometry tool that operates in both bright-field mode and dark-field mode. Scatterometery tools with bright-field and dark-field modes operate with two different illumination mode settings. In bright-field mode, incident radiation reaches features of samples at a wide range of incidence angles causing both ordered scattered incident radiation and diffuse scattered incident radiation to leave the feature. The 0th diffraction ordered scattered incident radiation is filtered from the scattered radiation and used to determine one or more critical dimensions (CD) of the feature. Using the CD of the feature, a model is created to determine the amount of ordered scattered incident radiation characterized by a diffraction order other than Zero. In dark-field mode, the incident radiation reaches the feature of the sample at a very narrow range of incidence angles. By monitoring the angular response of the incident radiation, one can directly measure the amount of ordered scattered incident radiation characterized by a diffraction order other than Zero and/or diffuse scattered radiation. For more information on scatterometry tools with both bright-field and dark-field modes see Zhuang et al., U.S. Pat. No. 8,045,179, which is incorporated herein by reference.

The selection of the metrology tool or tools 201 are then used as input to the optimal metrology target design process 202. In the design process 202 a first target design may be generated by selecting a first design type based on design types compatible with a multi-setting metrology tool or multiple different overlay metrology tools and a first set of design parameters based on design parameter ranges of the multi-setting metrology tool or multiple overlay different metrology tools. A computer program may perform a metrology simulation that simulates measurement of one or more target designs with one or more metrology tools within boundaries of a simulation range for two or more measurement settings to generate one or more performance metrics for the measurement. Simulating the measurement may take into account layer properties of one or more layers in a stack profile. Measurement simulation may taking into account interactions of probing radiation with the target designs for two or more measurement settings Metrology simulations may be repeated for different sets of measurement settings for a given metrology tool and performance metrics obtained for each candidate target design and set of measurement settings may be compared to determine the optimal tool settings and target design.

An optimal target design may be determined from criteria weighted sum of performance metrics as discussed above. Alternatively, each target design may be compared against predetermined selection criteria. If a first candidate target design meets or exceeds the selection criteria then the optimal design has been determined. If first candidate target design does not meet or exceed the selection criteria the measurement simulation may be iteratively repeated for one or more different target designs and compatible measurement settings. Specifically, a second target design may be generated for the same or different design type based on design types compatible with the selected metrology tool or multiple different metrology tools and a second set of design parameters based on parameters ranges of the tool or tools. The second candidate target design may be characterized by a different design type or different design parameters than the first candidate target design. Metrology simulation may be repeated for different sets of measurement settings for a given metrology tool and the resulting performance metrics may be analyzed to determine the optimal tool settings and target design.

The result of the target design process as discussed above is optimal design type, optimal design parameters and tool settings for each of the metrology tool or tools. The optimal design type and optimal design parameters may be sent to a patterning tool in a wafer fab where the selected optimal design may be patterned onto a wafer either on the substrate or in a layer 203 or stored in memory or storage for later user. Such patterning may involve using the optimal design as part of a mask pattern, fabricating a mask with the pattern, and performing photolithography with the fabricated mask. Alternatively, patterning may involve using the optimal design as part of a charged particle beam (e.g., electron beam) lithography pattern and performing charged particle beam lithography with the pattern. The optimal tool settings are sent to a metrology station which applies the optimal tool settings to the metrology tool or tools at the metrology tool station 204. After patterning with a mask the wafer with the optimal target design, a metrology measurement is taken of the target design using the metrology tool or tools to determine the overlay 205 and alignment for the next layer. It should be noted that the use of a multi-setting metrology tool provides the benefit of the ability to discern between the real layer-to-layer overlay (the desired measurement) and systemic biases that may influence the overlay reading. For example and without limitation asymmetry in one of the patterned layers may be determined and corrected. Additionally, the present disclosure provides a single design optimized for two or more different measurement settings or tools as opposed to having two different targets each optimized of a different measurement setting or tool respectively.

System

Figure 3:
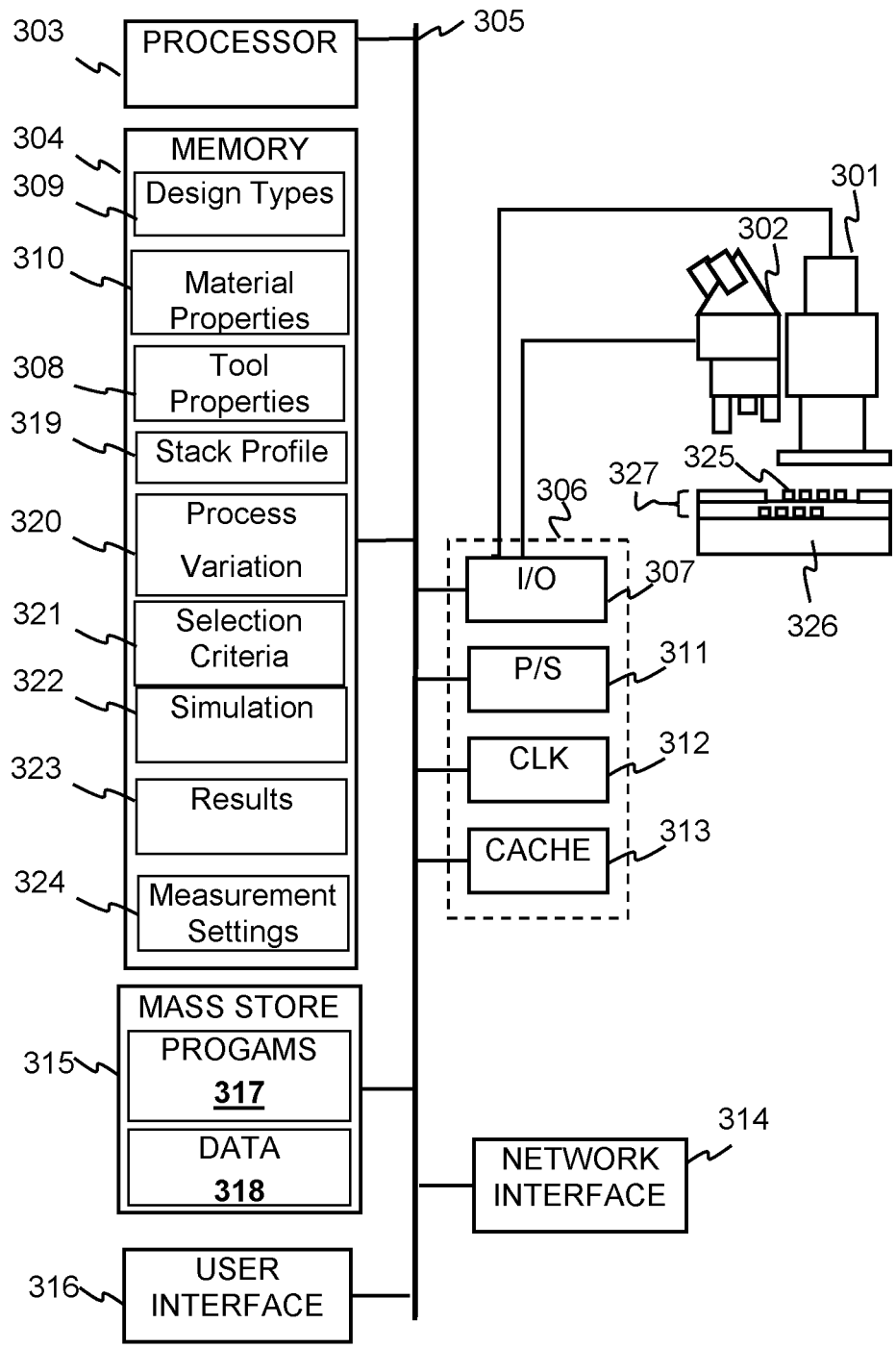
FIG. 3 is a block system diagram depicting a system configured to determine and use optimal overlay target design aspects of the present disclosure.

FIG. 3 depicts a system 300 configured to determine and use optimal overlay target design aspects of the present disclosure. The system 300 may include one or more processor units 303, which may be configured according to well-known architectures, such as, e.g., single-core, dual-core, quad-core, multi-core, processor-coprocessor, cell processor, and the like. The system may also include one or more memory units 304 (e.g., random access memory (RAM), dynamic random-access memory (DRAM), read-only memory (ROM), and the like).

The processor unit 303 may execute one or more programs 317, portions of which may be stored in the memory 304 and the processor 303 may be operatively coupled to the memory, e.g., by accessing the memory via a data bus 305. The programs 317 may be configured to determine optimal overlay targets for two or more types of metrology devices 301, 302 as described above with respect to FIG. 1 and FIG. 2. Additionally, the Memory 304 may contain information such as designs types 309, material properties 310, tool properties 308, stack profile 319, process variation ranges 320, selection criteria 321, simulation data 322, candidate target design simulation results 323 (e.g., performance criteria), and measurement settings 324. Additionally, the simulation data, target design simulation results, measurement settings, process variation ranges, selection criteria, tool properties, design types and design parameters, material properties and stack profile may be held as data 318 in the mass store 315. Data may also be stored in a database connected to the system in through the network interface 314.

The system 300 may also include well-known support circuits, such as input/output (I/O) 307, circuits, power supplies (P/S) 311, a clock (CLK) 312, and cache 313, which may communicate with other components of the system, e.g., via the bus 305. The computing device may include a network interface 314. The processor unit 303 and network interface 314 may be configured to implement a local area network (LAN) or personal area network (PAN), via a suitable network protocol, e.g., Bluetooth, for a PAN. The computing device may optionally include a mass storage device 315 such as a disk drive, CD-ROM drive, tape drive, flash memory, or the like, and the mass storage device may store programs and/or data. The system may also include a user interface 316 to facilitate interaction between the system and a user. The user interface may include a monitor, Television screen, speakers, headphones or other devices that communicate information to the user. The system may also be in communication with metrology tool or tools either through the network interface 314 or through an I/O port 307 as shown. The metrology tool or tools may include an optical tool 302 such as an optical microscope or an optical scatterometer and an Electron-beam tool 301 such as an electron microscope. The metrology tool or tools 301, 302 may be configured to perform overlay metrology with an optimal overlay target 325 as designed and chosen by the above described methodologies and patterned on a substrate 326 and/or in one or more layers 327 formed on the substrate by a lithography tool or tools that used the optimal overlay target design generated by the system 300.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶116.

What is claimed is:

1. A method for determination of a metrology target design, comprising:
    generating a first candidate target design for a selected design type compatible with one or more metrology tools or and a set of boundaries for a simulation range;
    simulating a measurement of the first target design with the one or more metrology tools within the boundaries of the simulation range for two or more measurement settings to generate one or more performance metrics for the measurement, wherein simulating the measurement takes into account layer properties of one or more layers in a stack profile;
    determining an optimal target design from the performance metrics based on a selection criteria;
    sending the optimal design to a patterning tool in a wafer fab to be patterned onto a wafer.

2. A system for determination of a metrology target design, comprising:
    a processor;
    a memory coupled to the processor;
    non-transitory instruction embedded in memory that, upon execution on the processor, implement a method of determination of a metrology target design comprising:
        generating a first candidate target design for a selected design type compatible with one or more metrology tools or and a set of boundaries for a simulation range;
        simulating a measurement of the first target design with the one or more metrology tools within the boundaries of the simulation range for two or more measurement settings to generate one or more performance metrics for the measurement, wherein simulating the measurement takes into account layer properties of one or more layers in a stack profile;
        determining an optimal target design from the performance metrics based on a selection criteria;
        sending or storing the optimal target design.

3. The system of claim 2, wherein the method of determination of a metrology target design further comprises simulating a measurement of a second target design with the one or more metrology tools within the boundaries of the simulation range for two or more measurement settings to generate one or more performance metrics for the measurement, wherein simulating the measurement takes into account layer properties of one or more layers in a stack profile.

4. The system of claim 2, wherein the boundaries of the simulation range include a range in variation of one or more layer properties.

5. The system of claim 2, wherein the boundaries of the simulation range include boundaries on ranges of or more target design parameters.

6. The system of claim 2, wherein the two or more measurement settings include settings for two more different metrology measurement modes.

7. The system of claim 2, further comprising a database coupled to the processor, the database including design types, design parameter ranges for a multi-setting metrology tool or multiple different overlay metrology tools, tool properties or material properties.

8. The system of claim 2 wherein simulating a measurement of the first target design with the one or more metrology tools includes simulating interactions of the first design with a multi-setting metrology tool or multiple different overlay metrology tools, and a substrate and one or more layers on the substrate in a stack profile during metrology measurements includes simulating interactions of probing radiation with the first target design, the substrate, one or more layers formed on the substrate, and one or more features on or in one or more layers of the stack profile.

9. A non-transitory instructions embedded in a computer readable medium for a method for determination of a metrology target design, comprising:
    generating a first candidate target design for a selected design type compatible with one or more metrology tools or and a set of boundaries for a simulation range;
    simulating a measurement of the first target design with the one or more metrology tools within the boundaries of the simulation range for two or more measurement settings to generate one or more performance metrics for the measurement, wherein simulating the measurement takes into account layer properties of one or more layers in a stack profile;
    determining an optimal target design from the performance metrics based on a selection criteria;
    sending or storing the optimal target design.

10. The non-transitory instructions embedded in a computer readable medium of claim 9, wherein the method for determination of a metrology target design further comprises simulating a measurement of a second target design with the one or more metrology tools within the boundaries of the simulation range for two or more measurement settings to generate one or more performance metrics for the measurement, wherein simulating the measurement takes into account layer properties of one or more layers in a stack profile.

11. The non-transitory instructions embedded in a computer readable medium of claim 9, wherein the boundaries of the simulation range include a range in variation of one or more layer properties.

12. The non-transitory instructions embedded in a computer readable medium of claim 9, wherein the boundaries of the simulation range include boundaries on ranges of or more target design parameters.

13. The non-transitory instructions embedded in a computer readable medium of claim 9, wherein simulating a measurement of the first target design with the one or more metrology tools within the boundaries of the simulation range for two or more measurement settings includes simulating a signal collected with the one or more metrology tools for the candidate target design for each of the two or more allowed measurement settings and for each of one or more possible variations in stack properties within the boundaries of the simulation range.

14. The non-transitory instructions embedded in a computer readable medium of claim 9, wherein the two or more measurement settings include different tool settings for one or more overlay metrology tools.

15. The non-transitory instructions embedded in a computer readable medium of claim 9, wherein the two or more measurement settings include settings for two more different metrology measurement modes.

16. The non-transitory instructions embedded in a computer readable medium of claim 15, wherein the two or more different metrology modes correspond to two or more different metrology tools.

17. The non-transitory instructions embedded in a computer readable medium of claim 16, wherein the two or more different metrology tools include an electron beam metrology tool or an optical scatterometry metrology tool.

18. The non-transitory instructions embedded in a computer readable medium of claim 9, wherein determining the optimal target design from the performance metrics based on the selection criteria includes calculating a weighted sum of performance criteria and determining one or more measurement settings that give a highest weighted sum of performance metrics.

19. The non-transitory instructions embedded in a computer readable medium of claim 18, wherein determining the optimal target design from the performance metrics based on the selection criteria further includes ranking one or more candidate target designs according to the weighted sum of performance metrics.

20. The non-transitory instructions embedded in a computer readable medium of claim 9, wherein simulating the measurement of the first target design with the one or more metrology tools includes modeling interactions of probing radiation with significant layers in the stack.

21. The non-transitory instructions embedded in a computer readable medium of claim 9 wherein simulating the measurement of the first target design with the one or more metrology tools includes modeling interactions of probing radiation with the first target design, a substrate, one or more layers formed on the substrate, and one or more features on or in one or more layers of the stack profile.

* * * * *